US006876654B1

(12) United States Patent
Hegde

(10) Patent No.: US 6,876,654 B1
(45) Date of Patent: Apr. 5, 2005

(54) METHOD AND APPARATUS FOR MULTIPROTOCOL SWITCHING AND ROUTING

(75) Inventor: Gopal Dattaray Hegde, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/058,335

(22) Filed: Apr. 10, 1998

(51) Int. Cl.[7] .............................. H04L 12/28; H04J 3/16
(52) U.S. Cl. ........................................ 370/392; 370/466
(58) Field of Search ................................. 370/392, 393, 370/401, 466, 378, 379, 382, 400, 402, 465, 467

(56) References Cited

U.S. PATENT DOCUMENTS

| | | | |
|---|---|---|---|
| 5,274,631 A | | 12/1993 | Bhardwaj |
| 5,309,437 A | | 5/1994 | Perlman et al. |
| 5,390,173 A | | 2/1995 | Spinney et al. |
| 5,426,637 A | | 6/1995 | Derby et al. |
| 5,430,727 A | | 7/1995 | Callon |
| 5,517,620 A | | 5/1996 | Hashimoto et al. |
| 5,539,736 A | * | 7/1996 | Johnson et al. ............. 370/402 |
| 5,555,543 A | | 9/1996 | Grohoski et al. |
| 5,572,533 A | * | 11/1996 | Sunada et al. .............. 714/712 |
| 5,610,905 A | * | 3/1997 | Murthy et al. .............. 370/401 |
| 5,640,399 A | | 6/1997 | Rostoker et al. |
| 5,715,250 A | * | 2/1998 | Watanabe .................... 370/395 |
| 5,757,795 A | * | 5/1998 | Schnell ........................ 370/392 |
| 5,920,566 A | * | 7/1999 | Hendel et al. ............... 370/401 |
| 5,920,699 A | * | 7/1999 | Bare ........................... 370/351 |
| 5,949,786 A | * | 9/1999 | Bellenger ................... 370/401 |
| 6,047,325 A | * | 4/2000 | Jain et al. .................... 709/227 |
| 6,049,834 A | * | 4/2000 | Khabardar et al. .......... 709/242 |
| 6,094,435 A | * | 7/2000 | Hoffman et al. ............. 370/414 |
| 6,128,298 A | * | 10/2000 | Wootton et al. ............. 370/392 |

FOREIGN PATENT DOCUMENTS

EP  0 465 201 A2  1/1992

OTHER PUBLICATIONS

Acharya, Arup; et al.; "IP Switching over Fast ATM Cell Transportation (IPSOFACTO): Switching multicast flows," Global Telecommunications Conf. 1997, vol. 3, pp. 1850–1856.

Stevens, W. Richard; "TCP/IP illustrated vol. 1," 1994, Addison–Wesley Professional Computing Series, pp. 225–227.

Douglas E. Comer and David L. Stevens, *Adress Discovery and Binding(ARP)*, Internetworking with TCP/IP, vol. II: Design, Implementation, and Internals, Chapter 4, 1994, pp. 39–59.

Douglas E. Comer and David L. Stevens, *RIP: Active Route Propagation and Passive Acquisition,* Internetworking with TCP/IP, vol. II: Design, Implementation, and Internals, Chapter 18, 1994, pp. 355–379.

* cited by examiner

*Primary Examiner*—Chau Nguyen
*Assistant Examiner*—Andy Lee
(74) *Attorney, Agent, or Firm*—Pillsbury Winthrop LLP

(57) ABSTRACT

A packet forwarding method and apparatus performs multiprotocol routing (for IP and IPX protocols) and switching. Incoming data packets are examined and the flow (i.e., source and destination addresses and source and destination socket numbers) with which they are associated is determined. A flow table contains forwarding information that can be applied to the flow. If an entry is not present in the table for the particular flow, the packet is forwarded to the CPU to be processed. The CPU can then update the table with new forwarding information to be applied to all future packets belonging to the same flow. When the forwarding information is already present in the table, packets can thus be forwarded at wire speed. A dedicated ASIC is preferably employed to contain the table, as well as the engine for examining the packets and forwarding them according to the stored information. Decision-making tasks are thus more efficiently partitioned between the switch and the CPU so as to minimize processing overhead.

16 Claims, 8 Drawing Sheets

US 6,876,654 B1

METHOD AND APPARATUS FOR MULTIPROTOCOL SWITCHING AND ROUTING

BACKGROUND OF THE INVENTION

1. Field of the Invention

The present invention relates to packet switches and routers, and more particularly, to a switching and routing method and apparatus capable of performing wire-speed switching and routing of data packets associated with a variety of network traffic protocols.

2. Description of the Related Art

Conventional network traffic is formatted into packets that are sent through the network according to destination addresses programmed in the packet header. The networking equipment used to forward such packets through a network includes routers, Layer 2 switches and Layer 3 switches. Each of these different types of equipment operate at different layers in the seven-layer OSI model. That is, for example, Layer 2 switches examine the Ethernet (MAC) addresses embedded in the packet to make forwarding decisions, while Layer 3 or "IP" switches examine the IP addresses embedded in the packet to make forwarding decisions. Both of these types of switches are good for the specific operation for which they are designed, but they can not be used to interconnect routed networks and network segments running multiple protocols such as IP and IPX that are fairly common on networks today.

Meanwhile, in the overall network, data must be routed and switched over different segments. Routers are used to interconnect different routed segments on the network. Conventional state-of-the-art routers employ general purpose CPU's to examine packet headers and to route the packets to their destinations appropriately. Although such CPU-assisted routers are able to handle the various routing protocols encountered, the processing overhead they require is substantial and this limits the rate at which traffic can be sent over the network.

A conventional network configuration is illustrated in FIG. 1. In such a configuration, Ethernet switch 10 provides a mechanism whereby dedicated 10 or 100 Mbps bandwidth is made available to nodes attached to ports 20 of switch 10. Most Ethernet switches today use Layer 2 switching. In this scheme, the switch builds a database containing the Ethernet addresses of the nodes and the ports to which they are attached. It then matches the destination Ethernet address in the packet (Layer 2 address in the seven layer OSI model) with addresses in the database to forward the packet on the port to which the destination node is connected. Most switches use some kind of hardware assistance to perform the lookup and forwarding operations at 10 or 100 Mbps wire speed.

Since Layer 2 switches use Ethernet addresses only, they are unable to provide connectivity between multiple IP or IPX networks or subnets. Nodes on IP networks are identified by IP addresses and subnet masks. Nodes on IPX networks are identified by IPX network and IPX node addresses. Since these addresses are at the network layer (Layer 3) of the seven layer OSI model, they are referred to as network addresses. Unlike Ethernet addresses that are assigned by network interface card vendors, system administrators or Internet Service Providers (ISPs) typically assign IP and IPX network addresses.

Routers such as router 30 are therefore required to connect multiple networks or subnets. Unlike switches, routers use Layer 3 addresses (network addresses) to forward packets. Routers also learn about other routers and thereby determine the different networks to which they are connected and the costs associated in reaching them. They forward the packets along the path with the lowest cost.

Since routers have to look deeper into packets and have to support different protocols with different packet formats, routing functions have been traditionally implemented mostly in software. Routers therefore can forward packets at rates of only about a tenth of those provided by Layer 2 switches. To improve performance, some routers use very high-speed processors, and some also use multiple processors and large amounts of high-speed memory. Therefore they are much more expensive than layer 2 switches. A typical routers costs per port are about seven to eight times the per port costs of a comparable Layer 2 switch.

Conventional routers, moreover, do not perform switching operations and therefore can not be used to connect networks that run non-routable protocols such as NetBios, DLC/LLC and LAT. Routers also can not be used to connect multiple nodes belonging to the same IP or IPX networks since each router interface must belong to a different IP or IPX network. Therefore, both routers and switches must be used together to form a switched internetwork, as illustrated in FIG. 1.

Recently, some switch vendors have attempted to marry the intelligence of routers with the speed of switches by adding some level of Layer 3 intelligence to their switch products, creating so-called Layer 3 switches. See, e.g., Keith Turner, "Is It A Switch Or Is It A Router," PC Magazine, Nov. 18, 1997, pp. 269–70. However, these schemes typically support only limited numbers of protocols, may require reconfiguration of end stations and still may require external routers.

Accordingly, there remains a need in the art for a switch that can switch and route network data packets associated with a variety of protocols at high rates with substantially less processing overhead, is inexpensive, does not require any external routers to operate, and does not require any reconfiguration of end stations. The present invention fulfills this need.

SUMMARY OF THE INVENTION

An object of the invention is to provide a method and apparatus that can forward packets to their destination at high throughput rates with substantially less processing overheads.

Another object of the invention is to provide a method and apparatus that can both switch and route packets with the same minimal processing overhead.

Another object of the invention is to provide a method and apparatus that is capable of both switching and routing packets at wire speed.

Another object of the invention is to provide a method and apparatus that is capable of wire-speed switching and routing of packets that belong to all possible network protocols.

Another object of the invention is to provide a method and apparatus that provides wire-speed switching and routing functionality in a switched internetwork, but does not require reconfiguration of existing end stations or network infrastructure.

Another object of the invention is to provide a method and apparatus capable of multiprotocol wire-speed switching and routing that is inexpensive to implement.

The present invention fulfills these objects, among others, by providing a method and apparatus for performing multiprotocol switching and routing. Incoming data-packets are examined and the flow (i.e., source node, the application running on the source node that is initiating the connection and generating the packets, destination node and the application on the destination node to which the traffic is destined) with which they are associated is determined. A flow table contains forwarding information that can be applied to the flow. If an entry is not present in the table for the particular flow, the packet is forwarded to the CPU to be processed. The CPU extracts the flow information from the packet and updates the table with forwarding information to be applied to all future packets belonging to the same flow. When the forwarding information is already present in the table, packets can thus be forwarded in hardware with no processor intervention at wire-speed. A dedicated ASIC is preferably employed to contain the table, as well as the engine for examining the packets and forwarding them according to the information stored in the flow tables. Decision-making tasks are thus more efficiently partitioned between the switch and the CPU so as to minimize processing overhead, while providing an inexpensive multiprotocol solution.

BRIEF DESCRIPTION OF THE DRAWINGS

These and other objects and advantages of the present invention will become apparent to those skilled in the art after considering the following detailed specification, together with the accompanying drawings wherein.

DETAILED DESCRIPTION OF THE PREFERRED EMBODIMENTS

Figure 1:
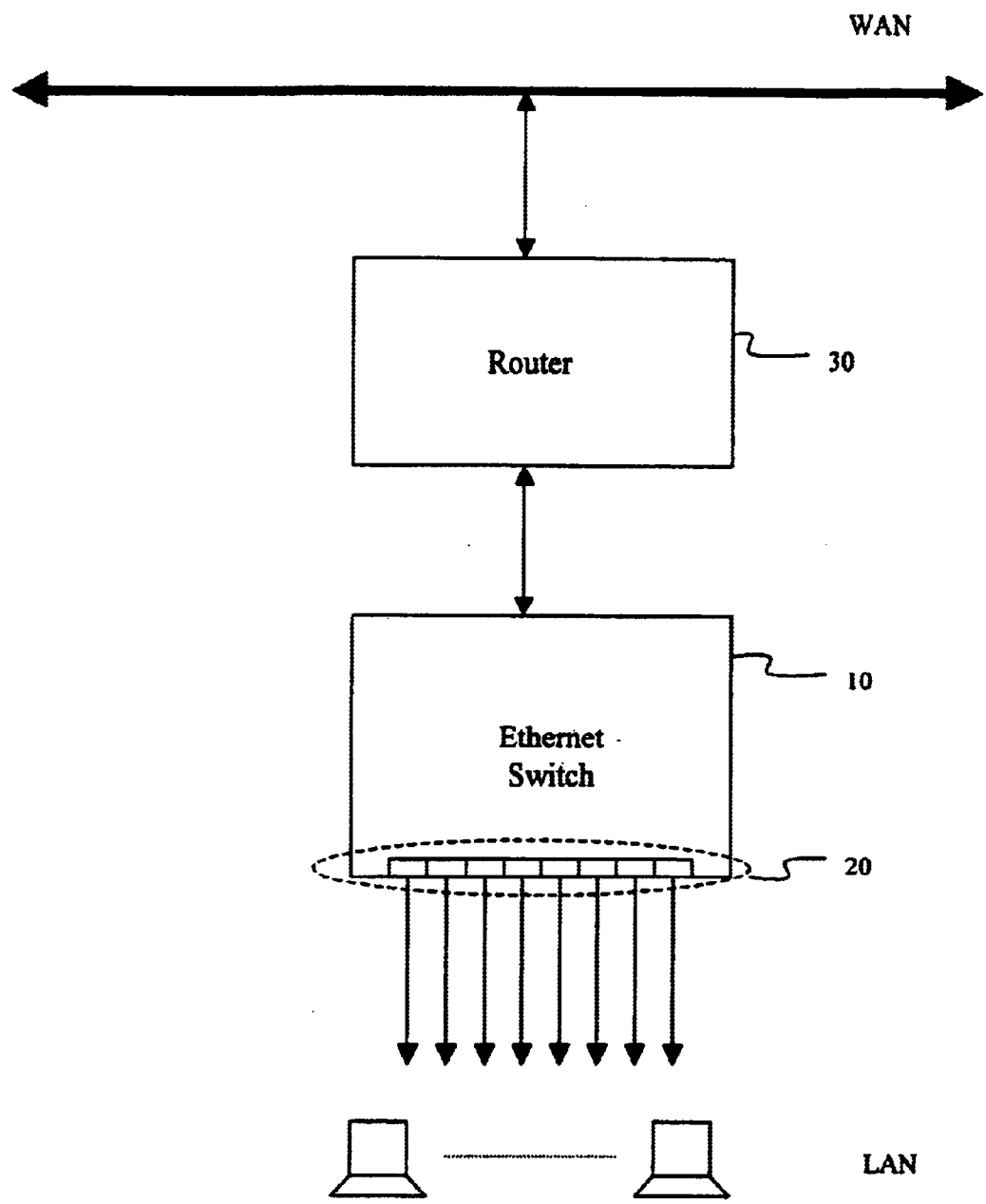
FIG. 1 is a block diagram illustrating conventional packet switching architecture.
Figure 2:
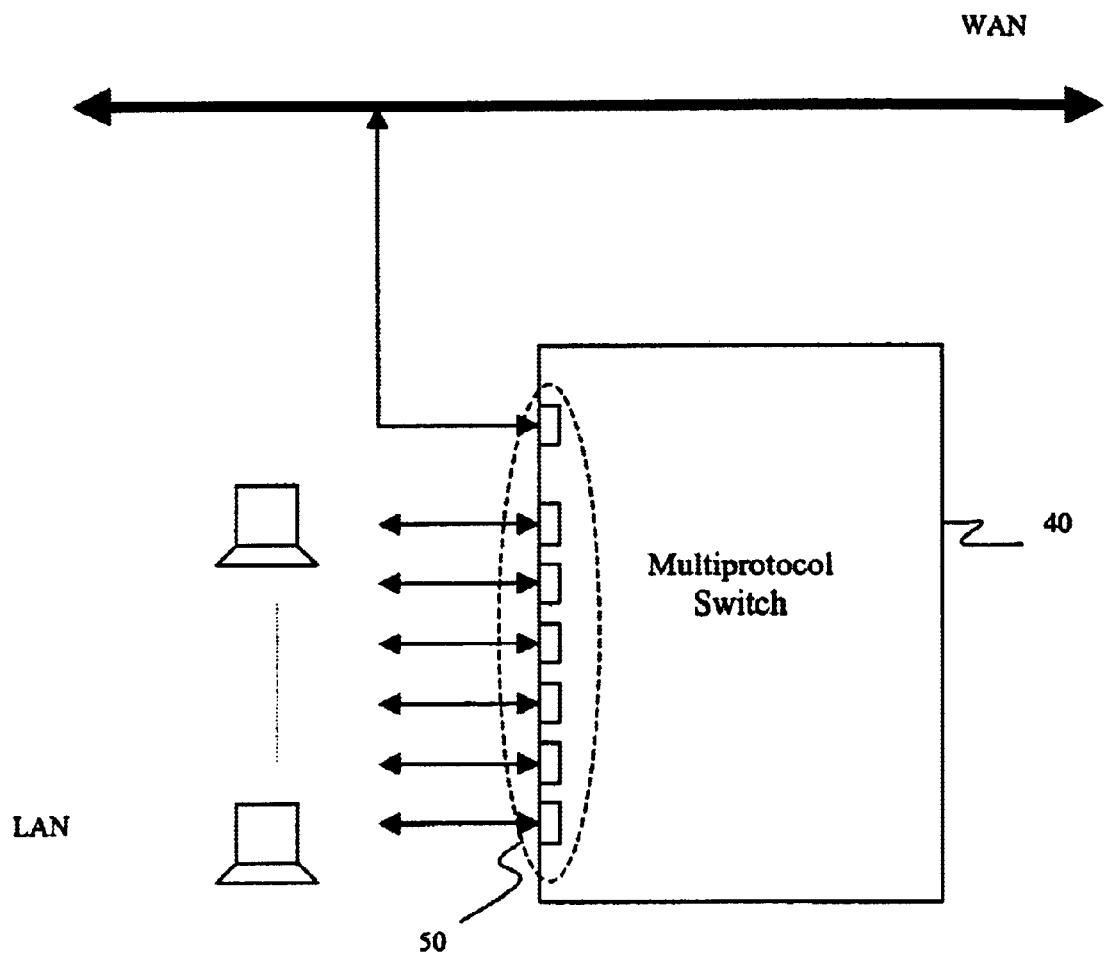
FIG. 2 is a block diagram illustrating packet switching architecture in accordance with the present invention.

FIG. 2 is a block diagram illustrating an architecture for performing multiprotocol routing in accordance with the principles of the invention. It includes a multiprotocol switch 40 having N input/output ports 50-1 . . . 50-N. In accordance with an object of the invention, as illustrated in FIG. 2, the input/output ports can be attached to nodes or they can be attached to different network segments or different networks in a local area network (LAN) directly or via routers. The novel ability of the multiprotocol switch of the present invention to forward packets among and between local nodes and external networks attached to it will be described below.

Figure 3:
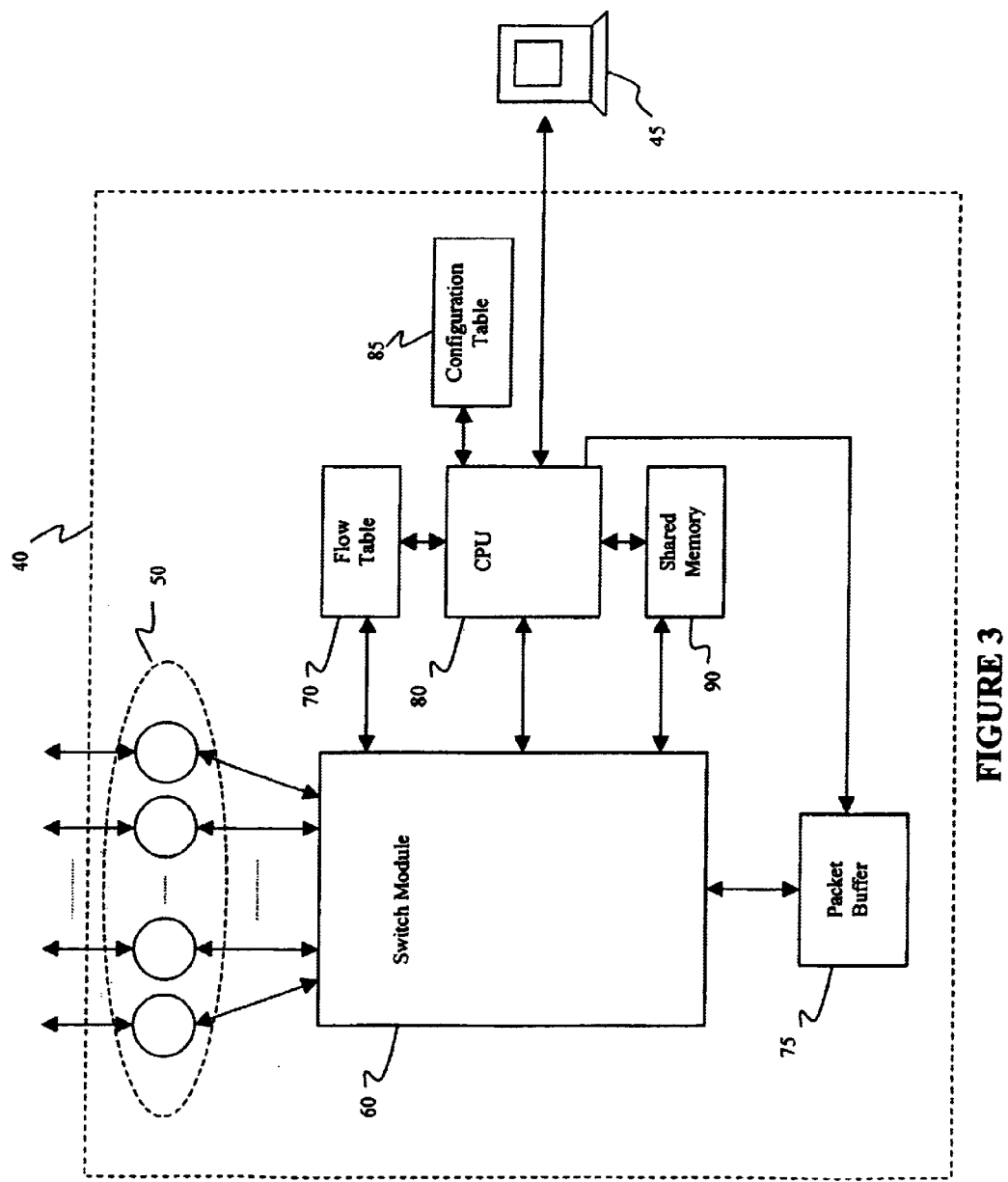
FIG. 3 is a block diagram illustrating a multiprotocol switch of the present invention in an architecture such as that illustrated in FIG. 2.

FIG. 3 further illustrates a multiprotocol switch 40 in accordance with the principles of the invention. In addition to input/output ports 50, it includes a switch module 60 and a flow table 70. Switch module 60 further communicates with a packet buffer 75, a CPU 80 and a shared memory 90. Flow table 70 and shared memory 90 are mapped memory spaces that are accessible by both switch module 60 and CPU 80. CPU 80 also communicates with a configuration table 85 and a system administrator 45.

Although shown separately for clarity, switch module 60 and flow table 70 are preferably implemented together as an application specific integrated circuit (ASIC). Such an implementation permits data packets to be switched between ports 50 at wire speed in accordance with flows specified in flow table 70. However, other specific implementations of switch module 60 and flow table 70 in accordance with the invention will be apparent to those skilled in the art after being taught by the following disclosures of their logical functions and data structures, for example. CPU 80 can be implemented by a MC680x0 microprocessor made by Motorola, Inc. of Schaumburg, Ill., and shared memory 90 can be implemented by a fast static RAM (SRAM) such as that manufactured by Samsung Inc. Packet buffer 75 for storing packets can be implemented using Synchronous DRAM (SDRAM) such as that manufactured by Samsung, Inc. CPU 80 programs the partitions for packet buffer 75 on a per port basis. The amount of memory allocated to each partition depends on port speed. So, for example, a gigabit port is allocated more memory than a 10/100 Mbps port.

Although not shown for clarity, it should be understood that CPU 80 can include program and data memory for storing programs that are executed by CPU 80 and data needed by those programs. Such data can include routing tables and the like. Programs executed by CPU 80 can include conventional routing update and costing functions implemented with known protocols such as Routing Information Protocol (RIP). Such conventional processes are in addition to the novel processes performed by the multiprotocol switch of the present invention that will be described in more detail below. However, a detailed description of such conventional processes will not be given so as not to obscure the invention.

Programs executed by CPU 80 also include processes for setting and maintaining system configuration information for the network in configuration table 85 in accordance with commands by system administrator 45, which system configuration information can include routing domains and gateway settings. If just layer 2 operation (where the packets are switched based on source and destination Ethernet addresses) is desired, no system configuration is required. The switch in this case becomes a true plug and play switch. For layer 3 routing operations, system administrators need to group ports into routing domains. Each routing domain represents a network segment. Administrators assign an IP address and subnet mask to each of the IP routing domains. All the ports that belong to a routing domain have the same IP address and different routing domains belong to different IP subnets. Administrators assign IPX network address to each of the IPX routing domains. All the ports that belong to a routing domain have the same IPX network address. Administrators can also assign unique IPX node addresses to each of the routing domains. By default, the Ethernet address of the first port in the routing domain is used as the IPX node address for that routing domain. As will be explained in more detail below, the multiprotocol switch of the invention switches IP and IPX traffic between the nodes that belong to the same routing domain at wire speed at layer 3. IP and IPX traffic between nodes that belong to different routing domains is routed at wire speed.

In addition to these routing domain settings, a base Ethernet address is assigned to the switch, which address is stored in a register when the switch is manufactured. Each of the ports 50-1 . . . 50-N have an Ethernet address associated therewith. The Ethernet address of port N is computed as a combination of the base Ethernet address and the number N of the port.

Ports 50 are preferably RJ45 10/100 Mb ports, and can include port modules such as, for example, a 8×10/100 Mb port module (100 Base TX), a 1-Gigabit port module, or a 6×100 Base FX port module. Ports 50 can also include a WAN module, for example, one that is capable of frame relay or ATM data transfer at T1/T3/E1/E3/OC-3 data rates:

In the architecture shown in FIG. 3; data packets arrive at ports 50-1 . . . 50-N. As will be described in more detail below, switch module 60 continually monitors each of the ports for incoming traffic. When an IP/IPX data packet arrives, it is buffered in packet buffer 75. While the data is flowing into packet buffer 75, the switch module 60 checks the packet header information, including source and destination addresses, and source and destination sockets (sockets identify applications communicating on the hosts associated with the source and destination addresses). If the packet header information matches a flow entry found in flow table 70, switch module 60 forwards the packet to the appropriate port 50-1 . . . 50-N. If no entry is found, the packet is buffered in shared memory 90 and CPU 80 is notified. CPU. 80 determines the flow information for the packet, and updates flow table 70 with a new rule for all future received packets associated with the same flow. CPU 80 then forwards the packet buffered in shared memory 90 on the appropriate port 50-1 . . . 50-N via switch module 60. Since an entry for the flow exists in the flow table 70 now, switch module 60 forwards all packets belonging to this flow in hardware to the appropriate port 50-1 . . . 50-N with no CPU intervention.

Figure 4:
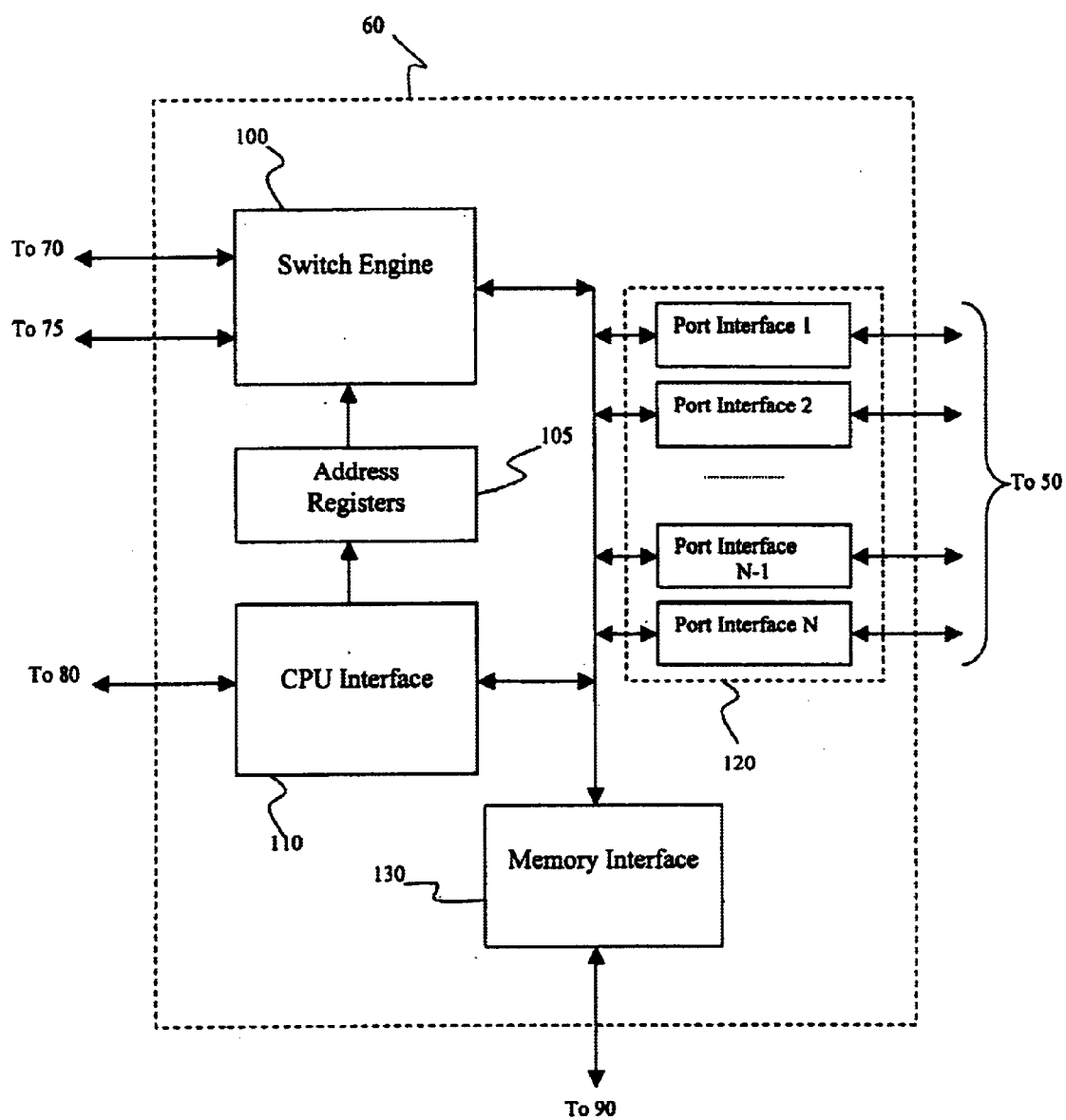
FIG. 4 is a block diagram illustrating a switch module of the present invention in a multiprotocol switch such as that illustrated in FIG. 3.

FIG. 4 further illustrates a switch module 60 in accordance with the architecture illustrated in FIG. 3. As can be seen, it includes switch engine 100, address registers 105, CPU interface 110, port interfaces 120-1 . . . 120-N, and memory interface 130. As is further apparent from the figure, switch engine 100 accesses information contained in flow table 70 and address registers 105, and manages packets buffered in packet buffer 75. CPU interface 110 communicates with CPU 80, thereby providing means of communication between CPU 80 and switch engine 100, address registers 105, port interfaces 120-1 . . . 120-N, and memory interface 130. Port interfaces 120-1 . . . 120-N respectively communicate with ports 50-1 . . . 50-N, and memory interface 130 manages access to shared memory 90. It should be noted that in this configuration, both switch engine 100 and CPU 80 (via CPU interface 110 and memory interface 130) can forward packets on ports 50-1 . . . 50-N via port interfaces 120-1 . . . 120-N, although switch engine 100 can forward packets at wire speeds while CPU 80 can do so only with processing overhead.

Switch engine 100 performs the flow extraction and determination operations for packets received via port interfaces 120-1 . . . 120-N. It accesses flow table 70 to look up the forwarding information associated with the flows to which packets belong. Address registers 105 provide address information to assist switch engine 100 in locating appropriate flow information in flow table 70. The contents of these registers can be configured by CPU 80 via CPU interface 110, and can also include the base Ethernet address of the switch described above.

Port interfaces 120-1 . . . 120-N send and receive packets between the nodes to which they are attached. Packets received from attached nodes are buffered in packet buffer 75 and as they are coming into the switch, the flow information in the packet is processed by switch engine 100. If switch engine 100 can resolve the flow, received packets are immediately forwarded to the appropriate port via its corresponding port interface 120-1 . . . 120-N. If the flow is unresolved, switch engine 100 causes the packets to be stored in shared memory 90 via memory interface 130 and signals the CPU for assistance via CPU interface 110.

As is known, data packets traversing through a typical network have headers including the source and destination Ethernet addresses of the packets, and for IP/IPX networks, IP/IPX source and destination addresses. Ethernet addresses identify nodes in a non-IP/IPX network and IP/IPX addresses identify nodes within an IP/IPX network, as well as the networks to which they belong The packets may also contain source and destination socket numbers that uniquely identify host applications communicating via these nodes. Accordingly, information that uniquely identifies a flow of packets back and forth between two nodes and/or applications in any network can be derived from data packet headers. Once the flow information is learned and stored in flow table 70, any data packet belonging to such a flow can be immediately forwarded in hardware with minimal processing.

Switch engine 100 handles packets in accordance with the flows with which the packets are associated, as derived from the packet headers. An example of an Ethernet data packet header is shown below, having what is known as an Ethernet Type II format. As can be seen, it includes a six-byte destination address, a six-byte source address and a two-byte type field.

| Destination Address (6 bytes) | Source Address (6 bytes) | Type Field (2 bytes) |
| --- | --- | --- |

Other known formats include Ethernet 802.3, Ethernet 802.2 LLC and Ethernet SNAP.

The type field identifies the Layer 3 protocol used by the hosts communicating via the packet. For Ethernet Type II packets, some of the values in the type field are shown in the following table.

| Type Field Value (hex) | Protocol |
| --- | --- |
| 0x600 | XNS |
| 0x800 | IP |
| 0x806 | ARP |
| 0x8035 | RARP |
| 0x8137 | IPX |

In addition to these explicit type identifiers, it is known that different protocols use different Ethernet frame formats. IP uses Ethernet II and SNAP packet formats. IPX uses all four of the above-mentioned formats. AppleTalk uses the SNAP packet format and NetBios typically uses the Ethernet 802.2 LLC format.

Packets associated with IP and IPX protocols have additional header information following the Ethernet header. An example of an IP header format is shown below.

| Vers | HLEN | Service Type | Total Length | |
|------|------|--------------|--------------|--|
| (4 bits) | (4 bits) | (8 bits) | (16 bits) | |
| Identification | | | Flags | Fragment Offset |
| (16 bits) | | | (4 bits) | (12 bits) |
| Time to Live | | Protocol | Header Checksum | |
| (8 bits) | | (8 bits) | (16 bits) | |
| Source IP Address | | | | |
| (32 bits) | | | | |
| Destination IP Address | | | | |
| (32 bits) | | | | |
| IP Options (if any) | | | Padding | |
| (24 bits) | | | (8 bits) | |

Transmission Control Protocol (TCP) and User Datagram Protocol (UDP) use IP. In addition to the information above, the headers for these protocols further contain source and destination socket numbers, which can identify individual applications running on top of TCP/UDP such as FTP, Telnet, e-mail, and HTTP. TCP and UDP are at Layer 4 of the OSI model. As seen above, the portion of packet headers for the IP layer provides source and destination IP addresses to identify the end-to-end hosts through which the individual applications (identified by socket numbers) are communicating.

An example of an IPX header format is shown below.

```
Checksum (2 bytes)
Packet Length (2 bytes)
Transport Control (1 byte)
Packet Type (1 byte)
Destination Network (4 bytes)
Destination Node (6 bytes)
Destination Socket (2 bytes)
Source Network (4 bytes)
Source Node (6 bytes)
Source Socket (2 bytes)
```

The IPX protocol is at Layer 3 of the OSI model. Most Novell NetWare (trademark of Novell, Inc. of Provo, Utah) applications run on top of IPX. As seen above, IPX headers contain source and destination socket numbers, which identify host applications running on the nodes, in addition to IPX source and destination network and IPX source and destination node addresses, which identify the end-to-end IPX nodes by which the applications are communicating.

Packets associated with IP and IPX protocols can thus be identified with flows between IP and IPX node and/or network addresses and sockets (Layer 3), and those associated with other protocols can be identified with flows between Ethernet addresses (Layer 2).

Figure 5:
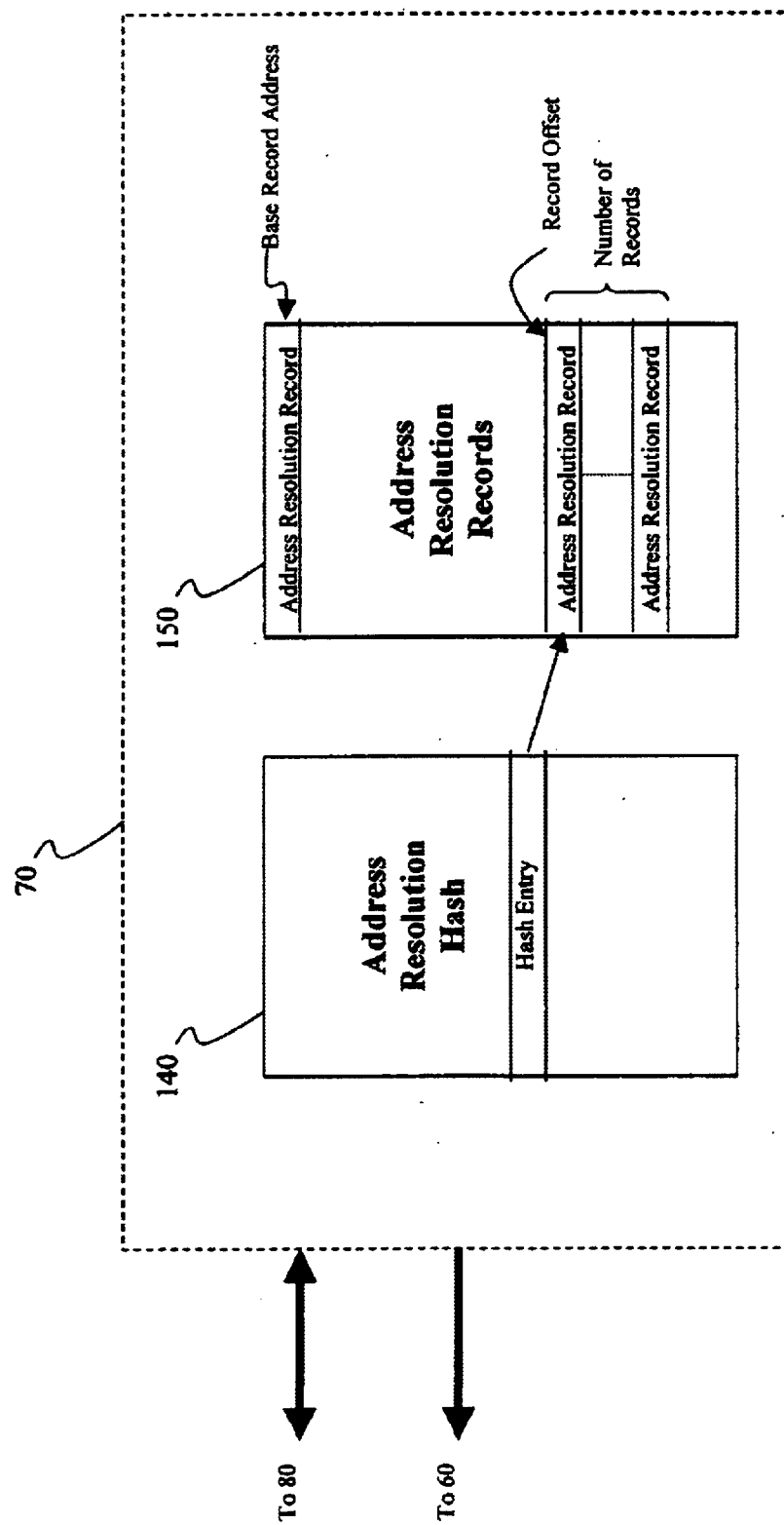
FIG. 5 is a block diagram illustrating a flow table of the present invention in a multiprotocol switch such as that illustrated in FIG. 3.

Switch engine 100 forwards packets to the appropriate port based on flow information stored in flow table 70. FIG. 5 illustrates the tables comprising flow table 70. In this example, flow table 70 includes address resolution hash 140 and address resolution record table 150. As will be explained in more detail below, address resolution record table 150 contains a list of address resolution records that provide forwarding information for each node that is communicating via the attached switched internetwork, and address resolution hash 140 contains pointers to records in address resolution record table 150. The locations of address resolution hash 140 and address resolution record table 150 within the memory space of switch engine 100 are programmed in address registers 105.

As seen above, Ethernet addresses are six bytes long. The first three bytes contain vendor identification and are typically fixed for different Ethernet products built by the same vendor. The last three bytes vary between these different products. As further seen above, IP and IPX addresses are four bytes long. The most commonly used IP addresses are Class C addresses, where within a single network, the first three bytes of the IP address are fixed and only the last byte varies.

The present invention uses bucket hashing for sorting the flow information to enable searching through the list of address resolution records faster. As seen above, for both IP/IPX and non-IP/IPX networks, the last one to three bytes are fairly unique for each node. Accordingly, the chance that the last twelve bits of a node address will be unique within any network is fairly high. Therefore, the last twelve (least significant) bits (0–11) of an IP address (for IP hosts), or IPX address (for IPX hosts) or Ethernet address (for hosts using other protocols) of the data packet header are used as a hash into flow table 70. This identifies the starting point of an address resolution record associated with the node. Address resolution hash 140 can store entries for $2^{12}$ possible hashes (4096). Actually, there are three separate hash areas of 4096 entries apiece, one each for non-IP/IPX flows, IP flows, and IPX flows. Each hash entry is 32 bits long and has a format as shown below (bit positions of each field shown in parentheses):

| Hash Accessed | Offset Address | Number of Records | Record Link Valid | No Entries Valid |
|---------------|----------------|-------------------|-------------------|------------------|
| (31) | (27-10) | (9-2) | (1) | (0) |

Where:

Hash Accessed—This bit indicates whether this hash has been accessed by switch engine 100. This can be used to age out hashes using the Least Recently Used (LRU) algorithm. Aging software on CPU 80 initially sets this bit on all the hash entries. When a node associated with this hash entry sends data on the network, switch engine 100 accesses the hash entry and clears this bit. The aging software can then come along later and delete all those hash entries that do not have the Hash Accessed bit cleared.

Record Offset—The address offset from the Base Record Address at which the first record entry for the group of records at this hash is stored. The first record entry will thus reside at location (Base Record Address+Record Offset). The Base Record Address is stored in address registers 105.

Number of Records—The number of records stored in the group of records, minus one. Therefore, if there are ten records stored in the group of records at this hash, this entry will contain a nine.

Record Link Valid—If this bit is set, then the data stored at location (Base Record Address+Record Offset+(Number of Records×2)+2) is actually a Link Entry. Since each hash can only point to 128 address resolution record entries (because of the number of bits in the Number of Record field), this bit can be used to increase the number of records for this hash value up to two-fold with Link Entries. If this bit is not set, and the No Entries Valid bit is also not set, then the data stored at (Base Record Address+Record Offset+(Number of Records×2)) is the last possible address resolution record for this particular hash entry.

No Entries Valid—If this bit is set, then there are no hash entries that match at this hash value.

Quite often, the hash derived from the least significant twelve bits of the Ethernet or IP/IPX address will, by itself, uniquely identify the flow with which the packet is associated. Accordingly, the Number of Records will be one, and the switch engine will not have to search through multiple records associated with the hash to find the forwarding information for the flow.

However, multiple flows can still hash onto the same address resolution hash entry. Therefore, the address resolution records table 150 must explicitly list all flows. The address resolution record entries associated with the flows for each hash are sorted using the remaining bits of the Ethernet address, or the remaining IP/IPX address bits and the socket number, from which the hash was derived. The Number of Records field (and possibly Record Link Valid field) in the address resolution hash entry indicates how many address resolution record entries exist for that hash. Switch engine 100 can then perform a binary search on these entries when attempting to resolve the flow. Each address resolution record entry contains information as shown below:

---

Ethernet Address bits 12–47
- OR -
IP/IPX Address bits 12–31
AND
Socket Number bits 0–15
Port Number
Swap Ethernet Address 0–47 bits

---

Where:
  Address bits—The remaining bits of the Ethernet address that were not used as the initial hash, or for IP and IPX packets, the remaining bits of the IP/IPX address and the socket number. If the socket is to be ignored for purposes of IP/IPX address resolution, a "don't care" value of 0xffff is used in its place.
  Port Number—The number of the port (50-1 . . . 50-N) on which this Ethernet (or IP or IPX) address resides.
  Swap Ethernet Address—For IP and IPX packets, this field contains the address used for swapping the Ethernet address of the destination during packet routing.

Figure 6:
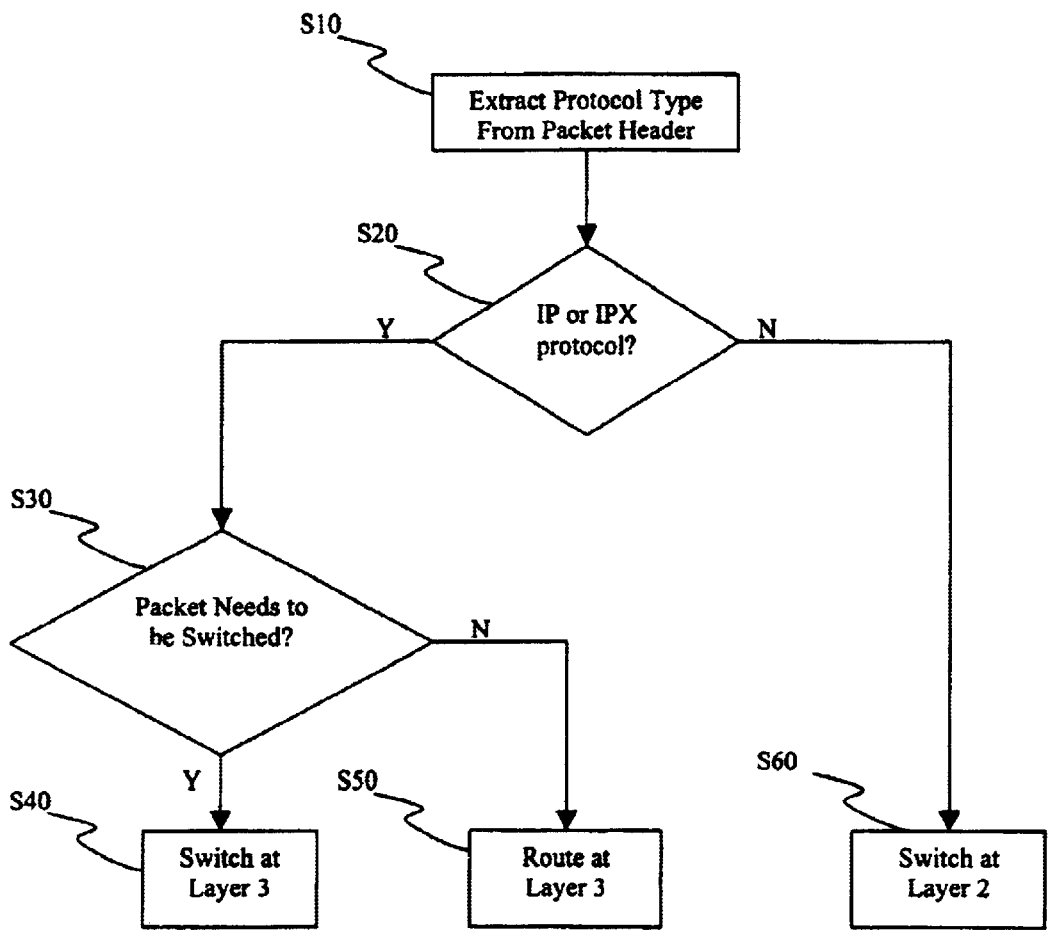
FIG. 6 is a flowchart illustrating a method used to forward data packets in a multiprotocol switch according to the present invention.

The operation of the multiprotocol switch of the present invention will now be described in more detail with reference to FIGS. 6 to 8.

Switch engine 100 continually monitors for data packets arriving on each of ports 50 via port interfaces 120-1 . . . 120-N. When a packet arrives, switch engine 100 buffers the packet in packet buffer 75. It then examines the Ethernet packet header and decides what to do with the packet in accordance with the protocol used by the hosts of the flow with which the packet is associated, and the algorithm illustrated in the flowchart in FIG. 6.

In step S10, switch engine 100 extracts the protocol type from the packet. This may be explicitly defined in the header as in the Ethernet Type II type field or may be implicitly determined from other information in the header.

In step S20, switch engine 100 determines from the packet header whether the protocol used by the hosts of the flow associated with the packet is IP or IPX. If so, processing advances to step S30 where a further determination is made whether the packet needs to be switched or routed. For example, if the destination Ethernet address in the packet is not the Ethernet address of the switch, then the packet needs to be switched. In this case, the packet is switched in accordance with IP/IPX flow information (i.e. Layer 3) (step S40). If the destination Ethernet address is the Ethernet address of the port of the switch and the destination IP or IPX address is not the IP/IPX address of the switch, for example, then that packet needs to be routed (step S50).

If the packet header indicates the hosts of the flow are not using IP or IPX protocols, the packet is switched using Ethernet address information (i.e. Layer 2) (step S60).

Figure 7:
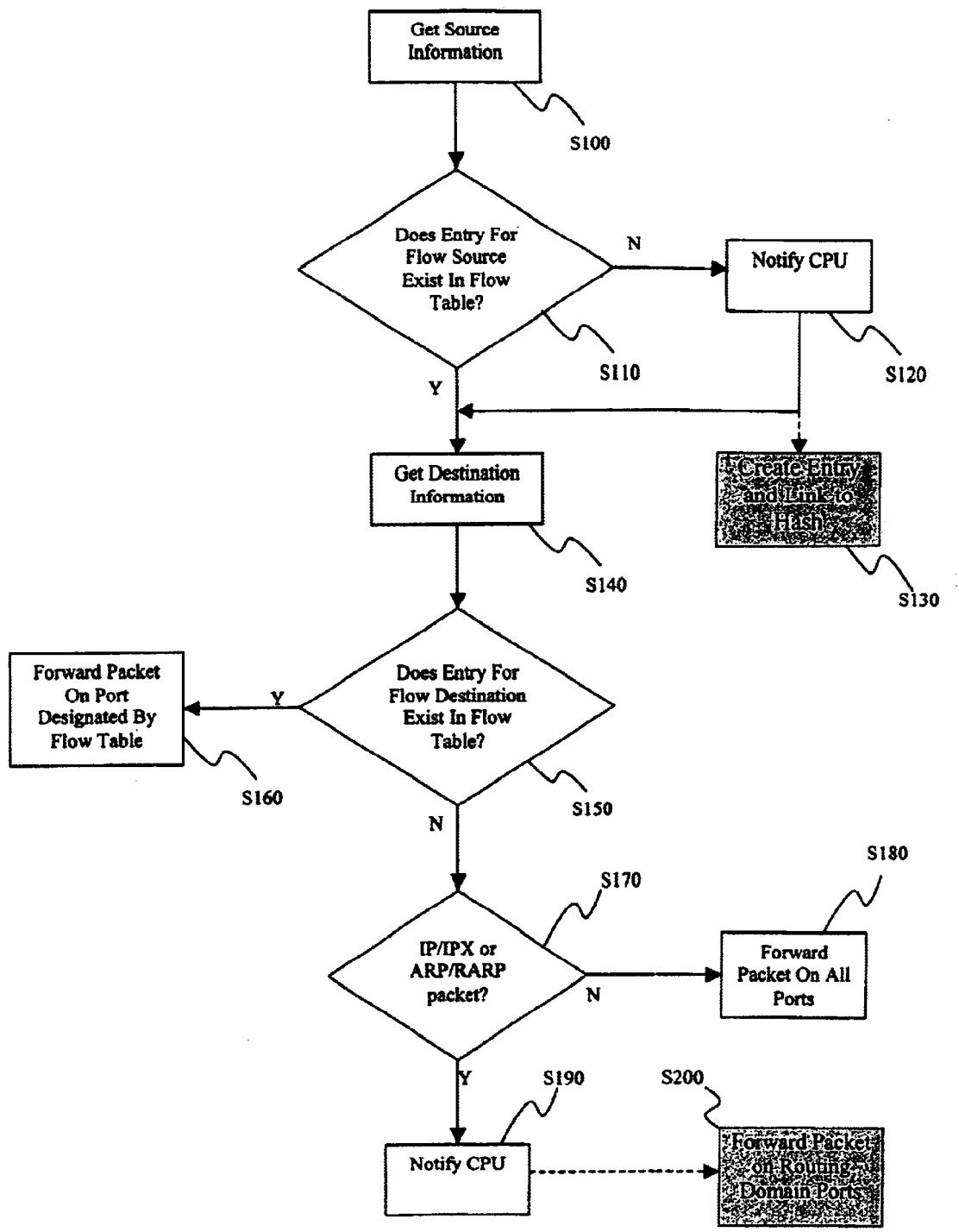
FIG. 7 is a flowchart illustrating a method used to switch data packets in a multiprotocol switch according to the present invention.

Packet switching in accordance with the principles of the invention is performed as illustrated in the flowchart in FIG. 7. In the flowchart, those process steps that are performed by CPU 80 (e.g. by software) rather than switch engine 100 (e.g. by hardware) in this example of the invention are shaded to assist an understanding of the invention.

When a packet requires switching (as in steps S40 and S60 of FIG. 6), switch engine 100 extracts information concerning the source node of the flow from the packet header (step S100). For non-IP/IPX protocols, the information extracted is the source Ethernet address. For IP/IPX protocols, the information extracted is the source IP/IPX address and socket. Switch engine 100 checks to see whether an address resolution record exists in the flow table for the extracted flow source information (step S110). This is done by hashing into flow table 70 using the last twelve bits of the source address and determining whether an address resolution record exists for the hash. That is, for example, the last twelve bits of the source address are combined with a base address (from address registers 105) for the hash area associated with that protocol in address resolution hash table 140. If a valid address resolution hash entry is found at this address, the record offset of the address resolution hash entry is combined with the base record address (from address registers 105) for address resolution records table 150 to locate the address resolution records linked to this hash. If there is more than one record linked to this hash, a binary search is performed using the remaining bits of the address that were not used as the original hash to locate the particular address resolution record for the source address.

If no entry in the flow table exists, switch engine 100 buffers the packet in shared memory 90 and notifies CPU 80 via CPU interface 110 (step S120). The message to the CPU contains the source and destination addresses, source and destination sockets (for IP and IPX packets), the port on which the packet arrived, and an indication about which one of the source and destination was unresolved. The CPU 80 then creates a hash entry in address resolution hash 140 using the last twelve bits of the source address (step S130). It also creates an address resolution record in table 150 containing the remaining source address bits, socket number (for IP and IPX packets), and port number, and links the address resolution record to the hash entry. If the hash entry already existed, CPU 80 creates a new address resolution record, increments the Number of Records field in the hash entry and sorts the existing address resolution records for the hash using the remaining bits in the Ethernet address (for non-IP/IPX packets) or the remaining bits of the IP/IPX address and the socket number (for IP and IPX packets).

Processing advances to step S140 where switch engine 100 extracts information concerning the destination node of the flow from the packet header. For non-IP/IPX protocols, the information extracted is the destination Ethernet address. For IP/IPX protocols, the information extracted is the destination IP/IPX address and socket.

Switch engine 100 then checks to see whether an address resolution record exists in the flow table for the extracted flow destination information (step S150). This is done by hashing into flow table 70 using the last twelve bits of the destination address and determining whether an address resolution record exists for the hash in the manner described above for the source address. If an address resolution record exists in the flow table, the packet is forwarded by switch engine 100 on the port that is associated with the destination indicated therein (step S160) and processing ends.

If it is determined in step S150 that no address resolution record exists in the flow table for the destination node of the flow, the packet should be broadcast so that the node associated with the destination can be identified. The destination node, if attached to the switch, will respond and the response packet will be processed as in FIG. 6 and steps S100–S120 described above. The response packet will have information concerning the destination node in the source portion of the packet header. Since no address resolution record will exist for the destination (now the source of the response packet), switch engine 100 will forward the packet to CPU 80 and a flow table entry for the node will be created as in step S130 above. At that point, flow table entries for both ends of the flow will have been created so that any subsequent packets belonging to that flow will be forwarded by switch engine 100 at wire speed.

Meanwhile, however, ARP, RARP and IP/IPX packets in a routed network should not be forwarded outside of the routing domain. Accordingly, IP/IPX, ARP and RARP packets (such as MAC level broadcast packets with destination Ethernet address=ff:ff:ff:ff:ff:ff) should be sent to CPU 80 along with the port number on which they arrived. CPU 80 can then determine the ports on which these packets need to be forwarded, so that they are forwarded only on the ports that belong to the same routing domain. Unresolved IP and IPX non-broadcast packets in a routed network are also sent only to the CPU 80 and are handled by the CPU in the same manner.

Accordingly, after the negative determination in step S150, the protocol of the packet is determined in step S170. Switch engine 100 recognizes the protocol carried by the packet by, for example, examining the protocol type field (or DSAP and SSAP values) in the Ethernet header. If the packet is not an IP/IPX, ARP or RARP packet, switch engine 100 forwards the packet on all ports except the port on which the packet arrived (step S180).

If it is an IP/IPX, ARP or RARP packet, and the entry does not exist, switch engine 100 buffers the packet in shared memory 90 and notifies CPU 80 that the packet is unresolved (step S190). If the packet needs to be switched, CPU 80 then forwards the packet on all the ports belonging to the same routing group (step S200). Information concerning which port belongs to which routing domains can be determined, for example, from configuration table 85 by CPU 80. If the packet does not need to be switched, for example, an ARP request packet that is addressed to the switch, CPU 80 holds the packet for processing and does not forward it.

Figure 8:
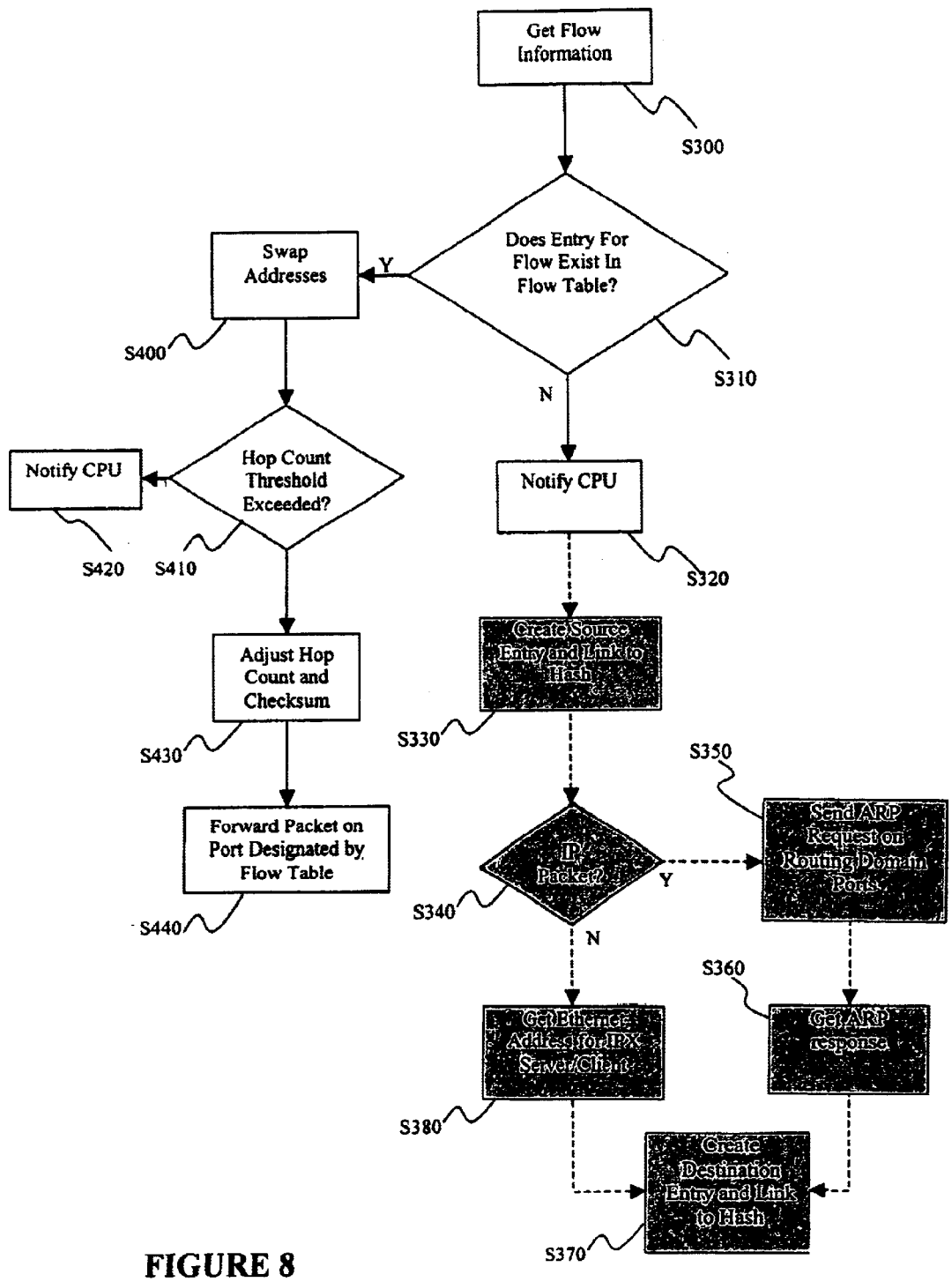
FIG. 8 is a flowchart illustrating a method used to route data packets in a multiprotocol switch according to the present invention.

Packet routing in accordance with the principles of the invention is performed as illustrated in the flowchart in FIG. 8. In the flowchart, those process steps that are performed by CPU 80 rather than switch engine 100 in this example of the invention are shaded to assist an understanding of the invention.

When a packet requires routing between IP/IPX networks (as in step S50 of FIG. 6), switch engine 100 extracts flow information, consisting of the source and destination IP/IPX addresses and socket numbers, from the packet header (step S300). Switch engine 100 checks to see whether address resolution records exist in the flow table for the flow (step S310). This is done by using the last twelve bits of the source IP/IPX address as a hash into flow table 70 and determining whether an address resolution record exists for the source at the hash. Then, using the last twelve bits of the destination IP/IPX address, switch engine 100 hashes into flow table 70 to determine whether an address resolution record exists for the destination.

Switch engine 100 needs to perform additional processing for IPX packets to determine whether to use the six-byte IPX node address or the four-byte IPX network address plus two-byte socket number for address resolution and routing. The following determination is made. If all six bytes of the IPX node address except the least significant byte are zero, it is determined that the hosts are using internal IPX addresses, so the four-byte network address and two-byte socket number are used. Otherwise, the six-byte IPX node address is used for switching or routing the packet.

If it is determined in step S310 that an address resolution record already exists for the flow (by comparing the source and destination addresses with flow table entries in similar manner as described above with reference to layer 2 switching), switch engine 100 determines the port on which the packets belonging to the flow need to be sent from the address resolution record for the destination. It swaps the source Ethernet address of the packet with the Ethernet address of the port on which the packet is going out (obtained by combining the base Ethernet address for the ports from address registers 105 with the port number). It also swaps the destination Ethernet address of the packet with the Ethernet address programmed in the Ethernet address swap field associated with the flow table entry (step S400). For IP packets, switch engine 100 also decrements the hop count field in the IP header and recomputes the IP checksum (step S430). If the hop count is zero before decrementing (as determined in step S410), the packet is sent to CPU 80 (step S420) so that CPU can send an ICMP redirect packet. For IPX packets, switch engine 100 increments the transport control (step S430). If the hop count is equal to or greater than 16 coming in (as determined in step S410), the packet is sent to CPU 80 for further processing (step S420). Otherwise, switch engine 100 forwards the packet on the port associated with the destination flow, as indicated by the address resolution record in the flow table 70 (step S440).

If, however, entries for the flow do not exist in the flow table, switch engine 100 buffers the packet in shared memory 90 and notifies CPU 80 via CPU interface 10 (step S320). The message to the CPU contains the source and destination IP/IPX addresses, source and destination Ethernet addresses, source and destination sockets, the port on which the packet arrived, and an indication about which one of the fields were unresolved.

CPU 80 first creates a hash entry in address resolution hash 140 using the last twelve bits of the source IP/IPX address (S330), if one does not already exist. It also creates an address resolution record in table 150 containing the remaining source address bits, the source socket number, and the port number. CPU 80 further programs the swap address field in the address resolution record with the source Ethernet address (address of the node that sent the packet) from the packet header. Once created, CPU 80 links the address resolution record to the hash. If the hash already existed, CPU 80 creates a new address resolution record as described above, increments the Number of Records field in the hash entry and sorts the existing address resolution records for the hash.

Processing advances to step S340 where CPU 80 begins processing to create a flow table entry for the destination node of the flow if one does not already exist. To do this, the swap address field of the address resolution record needs to be programmed with the Ethernet address of the destination, which was not contained in the packet received from the source of the flow. Different processing must be performed for IP and IPX packets to determine the Ethernet address of the destination node of the flow.

If the packet is an IP packet (as determined in step S340), CPU 80 determines the IP network the destination belongs to and determines the port(s) that connect to or belong to that network. This can be done, for example, by looking at the destination IP address and comparing it to IP network information and the ports belonging thereto, which information is stored in configuration table 85 and is maintained by CPU 80. CPU 80 then forwards an ARP request packet containing the destination IP address on all those ports to determine the Ethernet address of the destination (step S350). The host associated with the destination address, if connected to the switch, will send an ARP response containing its Ethernet address back to the switch. This response packet will be processed by switch engine 100 in accordance with the processing in FIG. 6 and FIG. 7, and will be forwarded to CPU 80 for handling. CPU 80 recognizes that the packet is a response to the ARP packet it previously sent out, so it extracts the Ethernet address contained in the response packet and records the port on which the packet arrived (step S360). For further information regarding binding machine level addresses with network level addresses using ARP, see generally Douglas E. Corner and David L. Stevens, Internetworking with TCP/IP—Vol. II: Design, Implementation, and Internals, 1994, Chapter 4, pp. 39–59.

If the packet is an IPX packet that needs to be routed and its destination address is unresolved (as determined in step S340), the Ethernet address of the destination is determined using. IPX RIP information in routing tables maintained by CPU 80 (if the destination is a NetWare server). If the destination is a NetWare client, then the destination Ethernet address is already known (step S380). For further information regarding route determination and updating using IPX RIP, see generally IPX Routing guide, Novell Press. Once the destination Ethernet address is known, the CPU 80 creates entries in table 150 (step 370). The steps followed are identical to the ones described above for IP. CPU 80 also must determine whether to use IPX network or node address as described above and create entries accordingly.

Switch engine 100 is preferably capable of simultaneously performing the above packet switching and routing for every port on the switch, so that nodes associated with any type of network using any type of communication protocol can send and receive packets to any other nodes attached to the switch. Accordingly, the switch of the present invention does not require certain nodes to be coupled to certain ports, nor that any type of network or protocol is represented among the attached nodes. That is, the switch is capable of performing wire-speed switching and routing regardless of whether all nodes coupled thereto belong to IP/IPX networks or non-IP/IPX networks or any combination thereof.

The following non-limiting examples are provided to illustrate the features of the invention as described above.

In the first example, assume that two machines (machine 1 and machine 2) are non-IP hosts attached to ports 1 and 2, respectively, of a multiprotocol switch according to the invention. Initially, the switch's flow table is empty. Thereafter, if machine 1 wants to talk to machine 2, machine 1 sends a packet containing its Ethernet address as the source Ethernet address and the Ethernet address of machine 2 as the destination.

The packet arrives on port 1 of the switch. Switch engine 100 determines that it is a packet belonging to a protocol other than IP or IPX and that there is no entry for in flow table 70 for machine 1. It forwards an unresolved entry message to CPU 80, which then creates an entry for machine 1. The switch does not have an entry for machine 2 in flow table 70; the destination is also unresolved. Therefore the switch forwards the packet on all ports except the port on which the packet arrived (i.e. port 1).

Machine 2 on port 2 of the switch receives the packet and responds with a packet containing its Ethernet address as the source and the Ethernet address of machine 1 as the destination. Switch engine 100 again sends a source unresolved entry to the CPU 80 since there is no entry for machine 2 in flow table 70. CPU 80 then creates entries for machine 2. The response packet is destined for machine 1 and the switch forwards the packet on port 1 as specified in the flow table. This forwarding is done completely in hardware.

Now Layer 2 entries for machine 1 and machine 2 exist in flow table 70 so switch engine 100 can forward packets back and forth between machine 1 and machine 2 in hardware at wire speed with no intervention by CPU 80.

In the next example, assume that machine 1 and machine 2 are IP hosts that belong to the same IP network (206.233.77.xxx) and are connected to ports 1 and 2, respectively, of the switch. Assume that the IP addresses and subnet masks of these machines are as follows:

IP Address of machine 1: 206.233.77.1, Subnet Mask: 255.255.255.0

IP Address of machine 2: 206.233.77.2, Subnet Mask: 255.255.255.0

Ethernet address of machine 1: 00:40:c8: 01:01:01

Ethernet address of machine 2: 00:40:c8: 01:01:02

To illustrate Layer 3 switching of IP packets assume that Layer 2 flow table entries for machine 1 and machine 2 already exist and that machine 1 wants to open a telnet session to machine 2. The following events take place:

1. Machine 1 needs to get the Ethernet address of machine 2 before it can talk to machine 2. This is done using ARP protocol, wherein machine 1 sends an ARP request containing the IP address of machine 2.
2. Machine 1 sends an ARP request packet, which needs to be switched at Layer 2. Switch engine 100 recognizes that the packet is an ARP packet and notifies CPU 80. CPU 80 determines the ports to which nodes of network 206.233.77.xxx are attached and then forwards the packet on all those ports except the port on which the packet arrived (port 1).
3. Machine 2 receives the ARP request and sends an ARP response, destined to the Ethernet address of machine 1. Switch engine 100 knows that machine 1 is on port 1 from the layer 2 flow table entry for machine 1, and forwards the response packet only on port 1.
4. Now machine 1 sends an IP packet to machine 2 with the following parameters:
    Source Ethernet address 00:40:c8: 01:01:01
    Destination Ethernet address=00:40:c8: 01:01:02
    Source IP address 206.233.77.1
    Destination IP address=206.233.77.2
    Source socket>1024 (since socket values between 1 & 1023 are reserved)
    Destination socket=23 (well known socket for telnet)
5. Switch engine 100 recognizes the packet as an IP packet, but there are no flow table entries for the source IP address and socket (206.233.77.1 & socket) of this flow. An unresolved entry message is therefore sent to CPU 80 indicating that the source IP address and socket are unresolved.
6. CPU 80 creates an entry for the source (206.233.77.1 & socket) as described above.
7. Since this is an IP packet, and the destination is unresolved, switch engine 100 notifies CPU 80, which forwards the packet on all ports with nodes of network 206.233.77.xxx attached thereto.
8. Machine 2 on port 2 gets the packet and sends a response back with the following parameters:
Source Ethernet address=00:40:c8: 01:01:02
Destination Ethernet address=00:40:c8:01:01:01
Source IP address=206.233.77.2
Destination IP address=206.233.77.1
Source socket a value>1024 OR 23 (depending on implementation).
Destination socket source socket from the packet from machine 1
9. The switch does not have an entry for the source IP and socket of this flow (206.233.77.2 & socket) in flow table 70 and so it sends an unresolved message to CPU 80. CPU 80 creates an entry for the IP address of machine 2 and the socket (206.233.77.2 & socket). Since an entry for machine 1's IP address & socket already exists in flow table 70, the switch forwards the response packet on port 1.
10. Now the switch has flow table entries for the telnet session between machine 1 and machine 2 in its flow tables and it switches packets for this session in hardware at wire speed with no processor intervention.

In the next example, assume that machine 1 and machine 3 are IP hosts that belong to two different IP networks and are connected to ports 1 and 3, respectively, of the switch. Assume that ports 1 and 2 of the switch belong to a first routing domain (206.233.77.0) and port 3 belongs to a different routing domain (207.233.77.0). Assume that the IP addresses and subnet masks of these machines are as follows:

IP Address of machine 1: 206.233.77.1, Subnet Mask: 255.255.255.0
IP Address of machine 3: 207.233.77.2, Subnet Mask: 255.255.255.0
Ethernet address of machine 1: 00:40:c8: 01:01:01
Ethernet address of machine 3: 00:40:c8: 01:01:02
IP Address assigned to all the ports of the switch belonging to routing domain 1: 206.233.77.2
IP Address assigned to all the ports of the switch belonging to routing domain 2: 207.233.77.1
Ethernet address of port 1 of the switch: 00:40:c8: 01:01:03
Ethernet address of port 3 of the switch: 00:40:c8: 01:01:04

To illustrate Layer 3 routing of IP packets, assume that Layer 2 flow table entries already exist for machine 1 and machine 3 and that machine 1 wants to open a telnet session to machine 3. The following sequence of events takes place:
1. Machine 1 compares its network address and subnet mask to machine 3's IP address and determines that machine 3 is on a different IP network and determines that it needs to go through a gateway. The IP address of routing domain 1 of the switch has been set up as the default gateway for machine 1.
2. Machine 1 needs to get the Ethernet address of its gateway before it can talk to machine 3. This is done using ARP protocol, wherein machine 1 sends an ARP request to the gateway.
3. Switch engine 100 recognizes that this is an ARP request and forwards it to CPU 80. CPU 80 sends an ARP response back to machine 1 with the MAC address of port 1 (00:40:c8: 01:01:03).
4. Now machine 1 sends an IP packet to machine 3 with the following parameters:
Source Ethernet address 00:40:c8: 01:01:01
Destination Ethernet address 00:40:c8: 01:01:03
Source IP address=206.233.77.1
Destination IP address=207.233.77.2
Source socket>1024 (since socket values between 1 & 1023 are reserved)
Destination socket=23(well known socket for telnet)
5. Switch engine 100 recognizes that this packet is to be routed at Layer 3 since the packet is addressed to port 1 of the switch but the destination IP address is not one of the IP addresses assigned to the switch interfaces. Further, since no entry in flow table 70 exists for the IP address of the source and destination (206.233.77.1 and 207.233.77.2), it sends an unresolved entry message to CPU 80 indicating that both source and destination IP addresses are unresolved.
6. CPU 80 creates a Layer 3 flow table entry for the source (206.233.77.1 & socket) as described above, and programs the Ethernet address of machine 1 (00:40:c8: 01:01:01) in the address swap field.
7. To determine the Ethernet address of machine 3, CPU 80 sends an ARP request on all ports of the switch belonging to routing domain 2.
8. Machine 3 receives the ARP request and responds with an ARP response containing its Ethernet address. Switch engine 100 forwards this packet to CPU 80. CPU 80 then creates a Layer 3 flow table entry for the destination (207.233.77.2 & socket) as described above and programs the Ethernet address of machine 3 (00:40:c8: 01:01:02) in the Ethernet address swap field.
9. The source and destination addresses of packets routed across different networks need to be changed. The source address should be replaced with the source address of the port of the switch forwarding the packet (in this case, port 3→00:40:c8: 01:01:04). The destination address should be replaced with the Ethernet address of the destination node (in this case, the address of machine 3, 00:40:c8: 01:01:04). Switch engine 100 swaps the source address in the packets to be routed with the address of the port forwarding the packet and the destination address with the address programmed in the swap field.
10. The first telnet session packet from machine 1 to machine 3 is dropped so machine 1 retransmits. Since the switch now has entries for the IP addresses of machine 1 and machine 3 in flow table 70, it routes packets between machine 1 and machine 3 at wire speed with no processor intervention.
11. Switch engine 100 also decrements the hop count of all packets belonging to the flow and if the packet comes in with a hop count of zero, it is sent to CPU 80. CPU 80 can then perform special processing; such as sending an ICMP redirect with Time to Live expired error.

In the next example, assume that machine 1 and machine 2 are IPX hosts that belong to the same IPX network. Assume that machine 1 is a NetWare file server and machine 2 is a NetWare client (end station). Assume that they are both using packets with an Ethernet 802.2 LLC frame type to communicate.

Network Address of machine 1: 00:00:00:02, Node Address: 00:40:c8:01:01:01

Network Address of machine 2: 00:00:00:02, Node Address: 00:40:c8:01:01:02

Ethernet address of machine 1: 00:40:c8:01:01:01

Ethernet address of machine 2: 00:40:c8:01:01:02

Ethernet address of port 1 of the switch: 00:40:c8:01:01:03

Ethernet address of port 2 of the switch: 00:40:c8:01:01:04

To illustrate Layer 3 switching of IPX packets, assume that Layer 2 flow table entries for machine 1 and machine 2 already exist and that the client wants to log into the file server. The following events take place:

1. Machine 2 (Client) sends out a Get Nearest File Server (or Get Server) request. This is an IPX SAP packet with the following header information.
    Source Ethernet address: 00:40:c8:01:01:02
    Destination Ethernet address: ff:ff:ff:ff:ff:ff (Broadcast).
    Source Network Address=00:00:00:00 (indicating that the network address is not known to the client)
    Destination Network Address=00:00:00:00
    Source Node address 00:40:c8:01:01:02 (This may be changed by user configurations on the machine, but by default, the Ethernet address of the machine is used).
    Destination Node Address=ff:ff:ff:ff:ff:ff (Node broadcast address).

2. Switch engine 100 recognizes that Layer 3 switching must be performed for this packet, and that the destination of the packet is unresolved. Moreover, switch engine 100 recognizes that it is an IPX/SAP packet, and so it forwards the packet to the CPU.

3. CPU 80 looks up system configuration information concerning the ports that have NetWare file servers attached thereto. If machine 1 is the only NetWare file server in the same routing domain as machine 2, CPU 80 simply forwards the packet to port 1. If more than one server is in the same routing domain, the SAP packet is forwarded to all of them.

4. If no servers are within the same routing domain as machine 2 (that is, in this example, if ports 1 and 2 belong to different IPX routing domains), then the switch acts as an IPX router. CPU 80 references its own SAP table and responds back with a Get Nearest Server response. The SAP table is an ordered list of IPX servers and the nearest server is first in the list. The name and network address of the first server in the SAP table is sent back in the response. CPU 80 uses the same Ethernet frame format as the client (i.e. Ethernet 802.2 LLC frame format in this example).

5. If machines 1 and 2 are in different routing domains, CPU 80 forwards a SAP response to machine 2 on port 2. The parameters of the SAP response are as follows:
    Destination address: 00:40:c8:01:01:02 (address of machine 2).
    Source address: 00:40:c8:01:01:04 (address of port 2 of the switch).
    IPX source network address: 00:00:00:02 (routing domain on which machine 2 resides).
    IPX source node address: 00:40:c8:01:01:04 (address of port 2)
    IPX destination network address: 00:00:00:02
    IPX destination node address: 00:40:c8:01:01:62 (address of machine 2).

5. Now the IPX client (machine 2) sends a RIP packet asking for a route to the file server returned by the Get Nearest Server or Get Server response. The RIP request has the following information in the IPX header:
    Source Ethernet address: 00:40:c8:01:01:02
    Destination Ethernet address: ff:ff:ff:ff:ff:ff (Broadcast).
    Source Network Address=00:00:00:02 (Network address of machine 2)
    Destination Network Address 00:00:00:02 (Network address for which the Ethernet address of the router needs to be determined).
    Source Node address 00:40:c8:01:01:02
    Destination Node Address ff:ff:ff:ff:ff:ff (Broadcast address).

6. Switch engine 1000 determines that this packet requires Layer 3 switching and that its destination is unresolved, and therefore it is forwarded to the CPU.

7. CPU 80 again looks up which IPX file servers are in the same IPX routing domain as machine 2. If one or more file servers or IPX routers are in the same IPX routing domain, (in this example, at least one file server is connected to port 1 of the switch), CPU 80 simply forwards the RIP request to those ports. In this example, the RIP request packet is forwarded at least on port 1 since the server (machine 1) is connected to port 1. The file server responds to the RIP request with the route information, including its Ethernet address. Switch engine 100 recognizes the RIP response packet as requiring Layer 3 switching with an unresolved destination. Since it is an IPX packet, switch engine 100 sends the response packet to the CPU, which forwards it on all the ports that belong to the same routing domain (in this case on port 2).

8. Since the client and server are in the same IPX network in this example, and since their node addresses are the same as their Ethernet addresses, flow table entries will exist for both the server and the client. Therefore, once the client has determined the route to the server, all packets between them will be switched at Layer 3 at wire speed using their Ethernet addresses.

In the final example, assume that machine 1 and machine 3 are IPX hosts that belong to two different IPX networks. Assume that ports 1 and 2 of the switch belong to the first routing domain (00:00:00:02) and port 3 belongs to a different routing domain (00:00:00:03).

Ethernet address of machine 2: 00:40:c8:01:01:02 (Client)

Ethernet address of machine 1: 00:40:c8:01:01:01 (Local file server)

Ethernet address of machine 3: 00:40:c8:01:01:06 (Remote file server to which user wants to login)

IPX Network Address assigned to all the interfaces of the switch in routing domain 1: 00:00:00:02

IPX Network Address assigned to all the interfaces of the switch in routing domain 2: 00:00:00:03

Internal IPX network address of the local file server: 00:00:00:05

Internal IPX network address of the remote file server: 00:00:00:06

Ethernet address of port 1 of the switch: 00:40:c8:01:01:03

Ethernet address of port 3 of the switch: 00:40:c8:01:01:05.

To illustrate Layer 3 routing of IPX packets, assume that Layer 2 flow table entries for machine 1 and machine 3 already exist and that machine 2 wants to login to the server on port 3.

1. The client (machine 2) creates a connection to the local server (machine 1) in the manner described in the previous example.
2. The client then scans the bindery of the local file server (if directory services is not running on the file server) or uses directory services to determine the network and node addresses of the remote server (in this example, machine 3).
3. The client (machine 2) now sends a RIP request to determine the IPX route to machine 3. Switch engine 100 forwards this packet to CPU 80, which recognizes that this RIP request is for a remote file server (a server that is not in the same routing domain as the client). As described in the previous example, CPU, 80 responds to the RIP request and provides the Ethernet address of port 2 of the switch as the Ethernet address of the gateway to the remote file server.
5. The client now communicates with the remote server on port 3 by sending an IPX packet containing the following parameters:
   Source Ethernet address: 00:40:c8:01:01:02 (machine 2)
   Destination Ethernet address: 00:40:c8:01:01:04 (port 2)
   Source IPX network address: 00:00:00:02 (routing domain 1)
   Destination IPX network address: 00:00:00:06 (Internal network address of the remote server)
   Source IPX node address: 00:40:c8:00:00:02 (machine 2)
   Destination IPX node address: 00:00:00:00:00:01 (Internal address)
6. Switch engine recognizes that this packet is to be routed at Layer 3 since it is an IPX packet that is addressed to one of the ports of the switch. Further, since no entry in flow table 70 exists for the IPX network addresses of the source and destination (00:00:00:02 and 00:00:00:06), it sends an unresolved entry message to CPU 80 indicating that both source and destination IP addresses are unresolved.
7. CPU 80 creates a Layer 3 flow table entry for the source (00:00:00:02+socket—a "don't care" value of 0xffff is used as the socket in this example) and programs the Ethernet address of machine 2 (00:40:c8:01:01:02) in the address swap field.
8. Packets belonging to this flow need to be routed between different networks. So, in packets sent from machine 2 to machine 3 the source Ethernet address should be replaced with the Ethernet address of port 3 and the destination Ethernet address should be replaced with the Ethernet address of the remote server (machine 3). CPU 80 determines the remote server's Ethernet address from its internally maintained IPX RIP information. It then creates a Layer 3 flow table entry for the destination (00:00:00:06+socket—in this case a "don't care" value of 0xffff is used as the socket) and programs the Ethernet address of machine 3 (00:40:c8:01:01:06) in the Ethernet address swap field.
9. The Ethernet address of IPX packets routed across different networks from machine 2 to machine 3 need to be changed. The source address should be replaced with the source address of the port of the switch forwarding the packet (in this case, port 3→00:40:c8:01:01:05) and the destination address should be replaced with the Ethernet address of the destination node (in this case, the destination Ethernet address of machine 3, 00:40:c8:01:01:06). In the previous step, the swap address was programmed into the flow table entry for machine 3 and so switch engine 100 carries out this operation automatically in hardware.
10. Since the switch now has entries for the IPX network addresses of machine 2 and machine 3 in flow table 70, it routes IPX server-client packets between machine 2 and machine 3 at wire speed with no processor intervention.
11. Switch engine 100 also increments the hop count of all packets belonging to the flow and if the hop count exceeds sixteen, the packet is sent to CPU 80. CPU 80 can then drop the packet.

It should be noted that CPU could perform conventional routing functions that are not directly performed by the switch module, including routing protocol updates and system administration functions. Moreover, the switch module can alert the CPU and forward such packets to the CPU 80 for processing in software. Examples of such packets include errored packets, IP packets that have options fields, IGMP, RSVP, and OSPF packets, and IP version 6 packets. The processing required for this functionality is known in the art and the details are not presented here so as not to obscure the invention.

It should be further noted that the multiprotocol switch of the present invention would appear as an IP/IPX router to other routers on the network, where such exist. No changes to an existing network infrastructure are needed, and none of the IP addresses, gateways, or subnet masks of existing nodes need be changed.

Although the present invention has been described in detail with reference to the preferred embodiments thereof, those skilled in the art will appreciate that various substitutions and modifications can be made thereto. For example, the flowcharts illustrating the processing for switching and routing packets are given to assist an understanding of the invention. It should be apparent, however, that the ordering and selection of processing steps is not limited to those examples, but that other sequences and arrangements can be programmed or otherwise implemented. Accordingly, these and other variations can be made while remaining within the spirit and scope of the invention as defined in the appended claims.

I claim:
1. An apparatus for forwarding packets between ports, said ports including a first port associated with a first host having a first layer 2 address and a first layer 3 address, and a second port associated with a second host having a second layer 2 address and a second layer 3 address, a layer 2 flow of packets between said first and second hosts being based on said first and second layer 2 addresses, a layer 3 flow of packets between said first and second hosts being based on said first and second layer 3 addresses, said apparatus comprising:
    a flow table comprising a plurality of address resolution records stored in an address resolution record table including:
        a first address resolution record that corresponds said first port with said first layer 2 address,
        a second address resolution record that corresponds said first port with said first layer 3 address,
        a third address resolution record that corresponds said second port with said second layer 2 address, and
        a fourth address resolution record that corresponds said second port with said second layer 3 address, wherein said first and second hosts have first and second sockets, respectively, said layer 3 flow being further based on said first and second sockets, said second address resolution record further corresponding said first port with said first socket, said fourth address resolution record further corresponding said second port with said second socket;

a switch module coupled to said ports and said flow table that detects said layer 2 flow arriving at one of said first and second ports, and forwards packets belonging thereto to the other of said first and second ports based on said first and third address resolution records, said switch module also detecting said layer 3 flow arriving at one of said first and second ports, and forwards packets belonging thereto to the other of said first and second ports based on said second and fourth address resolution records;

a CPU coupled to said flow table and communicating with said switch module, said CPU creating said first, second, third and fourth address resolution records in said address resolution record table;

a switch engine that determines whether said first and third address resolution records exist in said address resolution record table when said first flow is detected, and whether said second and fourth address resolution records exist in said address resolution record table when said second flow is detected; and a CPU interface that sends a first message to said CPU when said first flow is detected and said switch engine determines that said first and third address resolution records do not exist in said address resolution record table, said CPU interface sends a second message to said CPU when said second flow is detected and said switch engine determines that said second and fourth address resolution records do not exist in said address resolution record table, said CPU creating said first and third address resolution records in response to said first message, and said second and fourth address resolution records in response to said second message, wherein said flow table further includes an address resolution hash table comprising a plurality of address resolution hash records including:

a first address resolution hash record that corresponds a portion of said first layer 2 address with said first address resolution record;

a second address resolution hash record that corresponds a portion of said first layer 3 address with said second address resolution record;

a third address resolution hash record that corresponds a portion of said second layer 2 address with said third address resolution record; and a fourth address resolution hash record that corresponds a portion of said second layer 3 address with said fourth address resolution record, said switch module accessing said first, second, third and fourth address resolution records in accordance with said corresponding portions of said addresses and said first, second, third and fourth address resolution record hash records, respectively, said CPU linking said first and third address resolution hash records with said first and third address resolution records, respectively, in response to said first message, and linking said second and fourth address resolution hash records with said second and fourth address resolution records, respectively, in response to said second message.

2. An apparatus as defined in claim 1, wherein said switch module is comprised of an ASIC.

3. An apparatus as defined in claim 1, wherein said switch module and said flow table are together comprised of an ASIC.

4. An apparatus as defined in claim 1, wherein said first and second hosts belong to different networks.

5. An apparatus as defined in claim 1, wherein said layer 3 flow is in accordance with one of IP and IPX protocols.

6. An apparatus as defined in claim 5, wherein said layer 2 flow is in accordance with all protocols except IP and IPX.

7. A method of forwarding packets between ports of a switch, said ports being associated with hosts having addresses, said method comprising:

identifying a first address of a first one of said hosts;

identifying a first port associated with said first host;

creating a record that corresponds said first address with said first port;

storing said record in a table;

linking said record to a hash;

associating said hash with a portion of said first address;

receiving a data packet at a second port;

extracting said first address from said data packet;

retrieving said record by hashing onto said table using said portion of said first address; and forwarding said data packet to said first port in accordance with said record;

corresponding a swap address with said record;

receiving a second data packet at a third port;

routing said second data packet by forwarding said second data packet to said third port in accordance with said record and swapping a second address, the second address within said second data packet, with said swap address in accordance with said record.

8. A method as defined in claim 7, further comprising:

identifying a third address of a second one of said hosts, said second port associated with said second host;

creating a second record that corresponds said third address with said second port;

storing said second record in said table;

linking said second record to said hash;

associating said hash with a portion of said third address;

sorting said first and second records in said table based on said first and third addresses;

receiving a third data packet at the first port;

extracting said third address from said third data packet;

retrieving said second record by hashing onto said table using said portion of said third address and searching among said first and second records based on said third address; and forwarding said third data packet to said second port in accordance with said second record.

9. A method as defined in claim 7, wherein said second port is associated with a second one of said hosts, said first and second hosts belonging to different networks.

10. A method of forwarding packets between ports of a switch, said ports including a first port associated with a first host having a first layer 2 address and a first layer 3 address, and a second port associated with a second host having a second layer 2 address and a second layer 3 address, a layer 2 flow of packets between said first and second hosts being based on said first and second layer 2 addresses, a layer 3 flow of packets between said first a id second hosts being based on said first and second layer 3 addresses, said method comprising:

preparing a first address resolution record in a flow table that corresponds said first port with said first layer 2 address;

preparing a second address resolution record in said flow table that corresponds said first port with said first layer 3 address:

preparing a third address resolution record in said flow table that corresponds said second port with said second layer 2 address;

preparing a fourth address resolution record in said flow table that corresponds said second port with said second layer 3 address:

detecting said layer 2 flow arriving at one of said first and second ports and forwarding packets belonging thereto to the other of said first and second ports based on said first and third address resolution records;

detecting said layer 3 flow arriving at one of said first and second ports, and forwarding packets belonging thereto to the other of said first and second ports based on said second and fourth address resolution records;

determining wt ether said first and third address resolution records exist in said flow table when said layer 2 flow is detected;

determining whether said second and fourth address resolution records exist in said flow table when said layer 3 flow is detected:

creating said first and third address resolution records when said layer 2 flow is detected and when it is determined that said first and third address resolution records do not exist in said flow table;

creating said second and fourth address resolution records when said layer 3 flow is detected and when it is determined that said second and fourth address resolution records do not exist in said flow table;

preparing a first address resolution hash record in said flow table that corresponds a portion of said first layer 2 address with said first address resolution record;

preparing a second address resolution hash record in said flow table that corresponds a portion of said first layer 3 address with said first address resolution record;

preparing a third address resolution hash record in said flow table that corresponds a portion of said second layer 2 address with said third address resolution record;

preparing a fourth address resolution hash record in said flow table that corresponds a portion of said second layer 3 address with said fourth address resolution record;

linking said first and third address resolution hash records with said first and third address resolution records, respectively, when said layer 2 flow is detected and when it is determined that said first and third address resolution records do not exist in said flow table; and linking said second and fourth address resolution hash records with said second and fourth address resolution records, respectively, when said layer 3 flow is detected and when it is determined that said second and fourth address resolution records do not exist in said flow table.

11. A method as defined in claim 10, wherein said step of forwarding said packets belonging to said layer 2 flow includes accessing said first and third address resolution records in accordance with said corresponding portions of said addresses and said first and third address resolution record hash records, respectively, and wherein said step of forwarding said packets belonging to said layer 2 flow includes accessing said second and fourth address resolution records in accordance with said corresponding portions of said addresses and said second and fourth address resolution record hash records, respectively.

12. A method as defined in claim 10, wherein said layer 3 flow is in accordance with one of IP and IPX protocols.

13. A method as defined in claim 12, wherein said layer 2 flow is in accordance with all protocols except IP and IPX.

14. A method of forwarding packets between ports of a switch, said ports including a first port associated with a first host having a first layer 2 address and a first layer 3 address, and a second port associated with a second host having a second layer 2 address and a second layer 3 address, a layer 2 flow of packets between said first and second hosts being based on said first and second layer 2 addresses, a layer 3 flow of packets between said first and second hosts being based on said first and second layer 3 addresses, said method comprising:

preparing a first address resolution record in a flow table that corresponds said first port with said first layer 2 address;

preparing a second address resolution record in said flow table that corresponds said first port with said first layer 3 address;

preparing a third address resolution record in said flow table that corresponds said second port with said second layer 2 address;

preparing a fourth address resolution record in said flow table that corresponds said second port with said second layer 3 address;

detecting said layer 2 flow arriving at one of said first and second ports and forwarding packets belonging thereto to the other of said first and second ports based on said first and third address resolution records;

detecting said layer 3 flow arriving at one of said first and second ports, and forwarding packets belonging thereto to the other of said first and second ports based on said second and fourth address resolution records, wherein said first and second hosts have first and second sockets, respectively, said layer 3 flow being further based on said first and second sockets, said second address resolution record further corresponding said first port with said first socket, said fourth address resolution record further corresponding said second port with said second socket;

determining whether said first and third address resolution records exist in said flow table when said layer 2 flow is detected;

determining whether said second and fourth address resolution records exist in said flow table when said layer 3 flow is detected;

creating said first and third address resolution records when said layer 2 flow is detected and when it is determined that said first and third address resolution records do not exist in said flow table:

creating said second and fourth address resolution records when said layer 3 flow is detected and when it is determined that said second and fourth address resolution records do not exist in said flow table;

preparing a first address resolution hash record in said flow table that corresponds a portion of said first layer 2 address with said first address resolution record;

preparing a second address resolution hash record in said flow table that corresponds a portion of said first layer 3 address with said first address resolution record;

preparing a third address resolution hash record in said flow table that corresponds a portion of said second layer 2 address with said third address resolution record;

preparing a fourth address resolution hash record in said flow table that corresponds a portion of said second layer 3 address with said fourth address resolution record;

linking said first and third address resolution hash records with said first and third address resolution records, respectively, when said layer 2 flow is detected and when it is determined that said first and third address resolution records do not exist in said flow table; and linking said second and fourth address resolution hash records with said second and fourth address resolution records, respectively, when said layer 3 flow is detected and when it is determined that said second and fourth address resolution records do not exist in said flow table.

15. A method as defined in claim 14, wherein said step of forwarding said packets belonging to said layer 2 flow includes accessing said first and third address resolution records in accordance with said corresponding portions of said addresses and said first and third address resolution record hash records, respectively, and wherein said step of forwarding said packets belonging to said layer 3 flow includes accessing said second and fourth address resolution records in accordance with said corresponding portions of said addresses and said second and fourth address resolution record hash records, respectively.

16. A method as defined in claim 14, wherein said first and second hosts belong to different networks.

\* \* \* \* \*